UNITED STATES PATENT OFFICE.

JOHN G. FINKE, OF NEW YORK, N. Y.

IMPROVEMENT IN GRANULATED CHOCOLATE.

Specification forming part of Letters Patent No. 215,341, dated May 13, 1879; application filed February 27, 1879.

*To all whom it may concern:*

Be it known that I, JOHN GEORGE FINKE, of the city, county, and State of New York, have invented a new and useful Improvement in Granulated Chocolate, of which the following is a specification.

The object of this invention is to furnish chocolate so prepared that it may be ready for immediate use without scraping or grating, and so that one cup or more may be made ready at a time, as may be desired.

The invention consists in granulated chocolate prepared by coating the grains of granulated sugar with melted chocolate, and in the process of preparing granulated chocolate by melting the chocolate cakes in a water-bath to which the heat is applied, stirring the granulated sugar into the melted chocolate until the grains of sugar are thoroughly coated, and then pouring the mixture upon a stone and stirring it until cold, as hereinafter fully described.

In preparing my improved granulated chocolate, one or more cakes of chocolate, as found in market, are placed in a water-bath, to which the heat is applied. When the chocolate cakes are melted, granulated sugar, in the proportion of ten pounds of sugar to one and three-fourths pound of chocolate, is poured in, and allowed to stand until the sugar is thoroughly heated, usually about two hours. It is then thoroughly stirred until every grain of sugar is coated with chocolate. The mixture is then poured upon a stone and stirred until cold. The granulated chocolate thus prepared is then sifted, and is then ready for use, or to be put up for market.

I am aware that it is not new to form a chocolate-powder by triturating roasted cocoa or chocolate beans or nuts to a paste in a heated mortar with sugar and aromatics, cooling this in molds, and, finally, grinding to a coarse powder.

Having thus described my invention, I claim as new and desire to secure by Letters Patent—

A chocolate breakfast-powder consisting of sugar coated with chocolate and in a granulated form, as described.

JOHN GEORGE FINKE.

Witnesses:
 JAMES T. GRAHAM,
 C. SEDGWICK.